(No Model.)

T. HENNEBERRY.
ANTI-INTERFERING DEVICE.

No. 579,298.            Patented Mar. 23, 1897.

Witnesses

Inventor
Thos. Henneberry
By his Attorney

THE NORRIS PETERS CO., PHOTO-LITHO., WASHINGTON, D. C.

UNITED STATES PATENT OFFICE.

THOMAS HENNEBERRY, OF DENVER, COLORADO.

ANTI-INTERFERING DEVICE.

SPECIFICATION forming part of Letters Patent No. 579,298, dated March 23, 1897.

Application filed July 6, 1896. Serial No. 598,270. (No model.)

*To all whom it may concern:*

Be it known that I, THOMAS HENNEBERRY, a citizen of the United States of America, residing at Denver, in the county of Arapahoe and State of Colorado, have invented certain new and useful Improvements Anti-Interfering Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in means to prevent horses from interfering; and it consists of the features hereinafter described and claimed, all of which will be fully understood by reference to the accompanying drawings, in which is illustrated an embodiment thereof.

Figure 1:
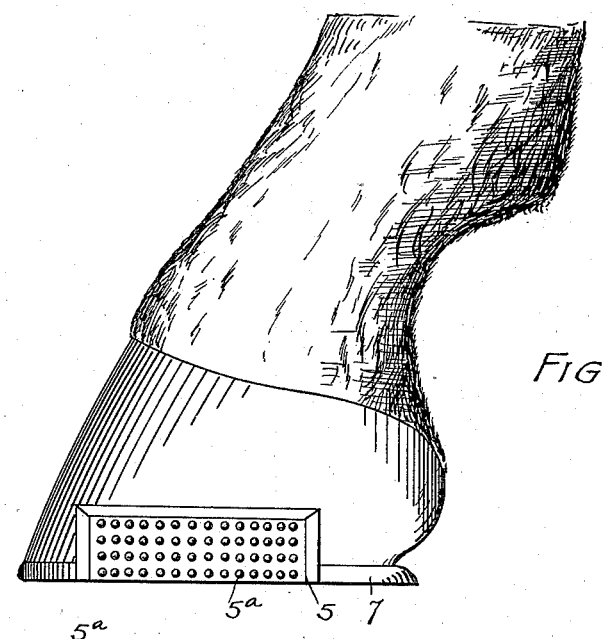
Figure 2:
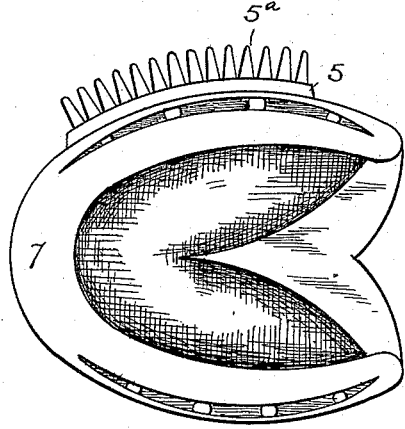
Figure 3:
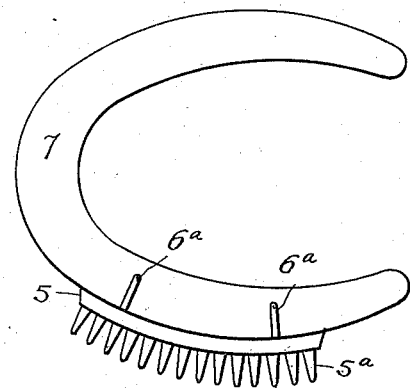
Figure 4:
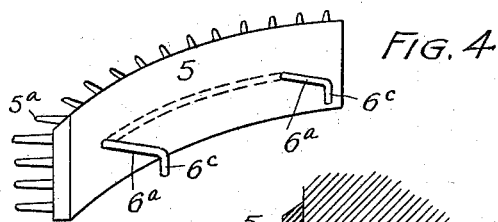
Figure 5:
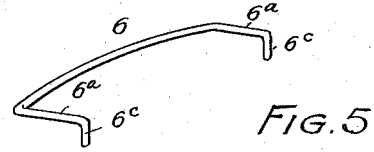
Figure 6:
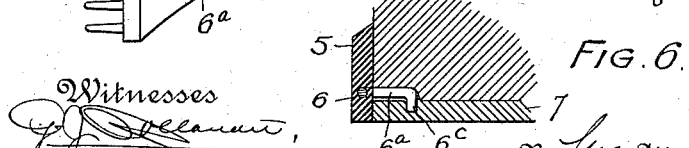

In the drawings, Figure 1 is a side elevation of a horse's foot with my improved anti-interfering device attached. Fig. 2 is an underneath view of the same. Fig. 3 is a top view of the shoe with the device attached. Fig. 4 is a perspective view of the device in detail. Fig. 5 is a similar view of the holder detached from the body of the device. Fig. 6 is a fragmentary sectional view illustrating a detail of construction.

Similar reference-characters indicating corresponding parts in all the views, let the numeral 5 designate a yielding and highly resilient or elastic pad, preferably composed of soft rubber and having fingers $5^a$ formed on its outer surface. These fingers are preferably formed integral with the body of the pad. They are soft and yielding and may be of any suitable length. It is believed they should be about one inch in length, but they may be either longer or shorter without departing from the spirit of the invention.

The pad may be applied to the hoof of the horse in any suitable manner. As shown in the drawings, a metal holder 6 is cast into the body of the pad when manufactured and having two projecting arms $6^a$, provided with bent extremities $6^c$, adapted to enter recesses formed in the shoe 7 just beneath the hoof. The location of the recesses in the shoe with reference to the length of the arm $6^a$ is such that the device is held securely in place when applied to the shoe. It is evident that when the shoe is attached to the hoof of the horse the device cannot move or become displaced. This soft-rubber pad is a preventive against interfering, and at the same time prevents the horse from injuring himself when he does interfere.

It is well understood that the chief object of my anti-interfering device is to prevent the horse from interfering by causing him to handle his feet in such a manner that they will not strike his limbs. When, however, the device is first attached, he will interfere until he becomes accustomed to it, and occasionally thereafter. Hence the necessity for a device so constructed is to prevent injury to the limbs of the animal when the device comes in contact therewith.

Having thus described my invention, what I claim is—

1. An anti-interfering device comprising a yielding and highly-resilient pad preferably composed of soft rubber and having soft elastic fingers formed on its outer surface; said fingers being preferably formed integral with the body of the pad, and suitable means for fastening the pad to the hoof of the horse, said means comprising a metal device attached to the pad and having one or more arms adapted to engage recesses formed in the shoe substantially as described.

2. An anti-interfering device comprising a soft-rubber pad having fingers formed on its outer surface and integral with the body of the pad, suitable means for attaching said pad to the hoof of the horse, said means comprising a device cast in the pad and having one or more horizontal projections provided with depending extremities adapted to engage recesses formed in the shoe as and for the purpose set forth.

In testimony whereof I affix my signature in the presence of two witnesses.

THOMAS HENNEBERRY.

Witnesses:
G. J. ROLLANDET,
ALFRED J. O'BRIEN.